United States Patent
Rich, Sr.

(10) Patent No.: US 6,169,343 B1
(45) Date of Patent: Jan. 2, 2001

(54) MOTOR AND GENERATOR WHEREIN MAGNETISM AIDS MOTION

(76) Inventor: Joe G. Rich, Sr., 17141 NW. 2nd Ct., Miami, FL (US) 33169-5995

( * ) Notice: Under 35 U.S.C. 154(b), the term of this patent shall be extended for 0 days.

(21) Appl. No.: 09/174,128

(22) Filed: Oct. 16, 1998

Related U.S. Application Data

(60) Provisional application No. 60/062,008, filed on Oct. 17, 1997.

(51) Int. Cl.$^7$ .................................................. H01J 29/46
(52) U.S. Cl. ........................................................... 310/15
(58) Field of Search ........................... 310/46, 152, 154, 310/156, 12, 15, 177, 178

(56) References Cited

U.S. PATENT DOCUMENTS

| | | | |
|---|---|---|---|
| 5,105,111 | * | 4/1992 | Luebke ..................................... 310/46 |
| 5,191,258 | * | 3/1993 | German ................................... 310/254 |
| 5,227,702 | * | 7/1993 | Nahirney ................................ 310/156 |
| 5,404,063 | * | 4/1995 | Mills ....................................... 310/266 |
| 5,616,974 | * | 4/1997 | Yamada ................................. 310/68 B |
| 5,696,419 | * | 12/1997 | Rakestraw et al. ..................... 310/268 |
| 5,925,958 | * | 7/1999 | Pirc ........................................ 310/152 |

\* cited by examiner

*Primary Examiner*—Clayton LaBalle
(74) *Attorney, Agent, or Firm*—Robert M. Schwartz

(57) ABSTRACT

The invention includes an apparatus to improve the efficiency of motors and generators by reducing counter electro motive force, including rotary and reciprocating piston embodiments constructed and arranged such that the motion is aided by the magnetic field rather than hindered.

2 Claims, 11 Drawing Sheets

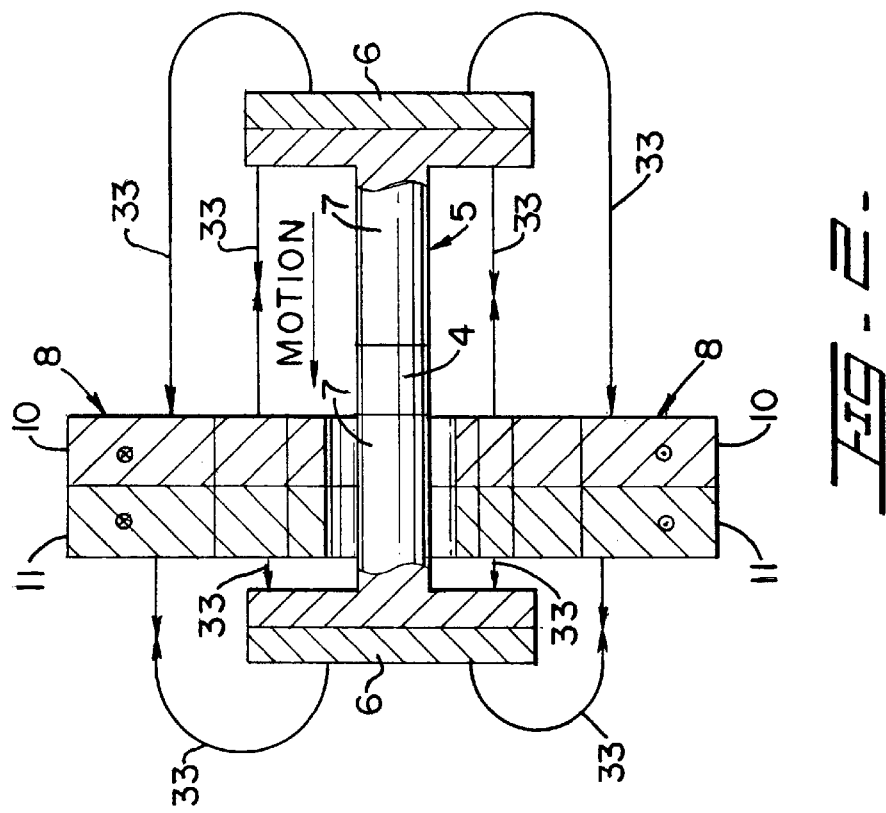
FIG-1-
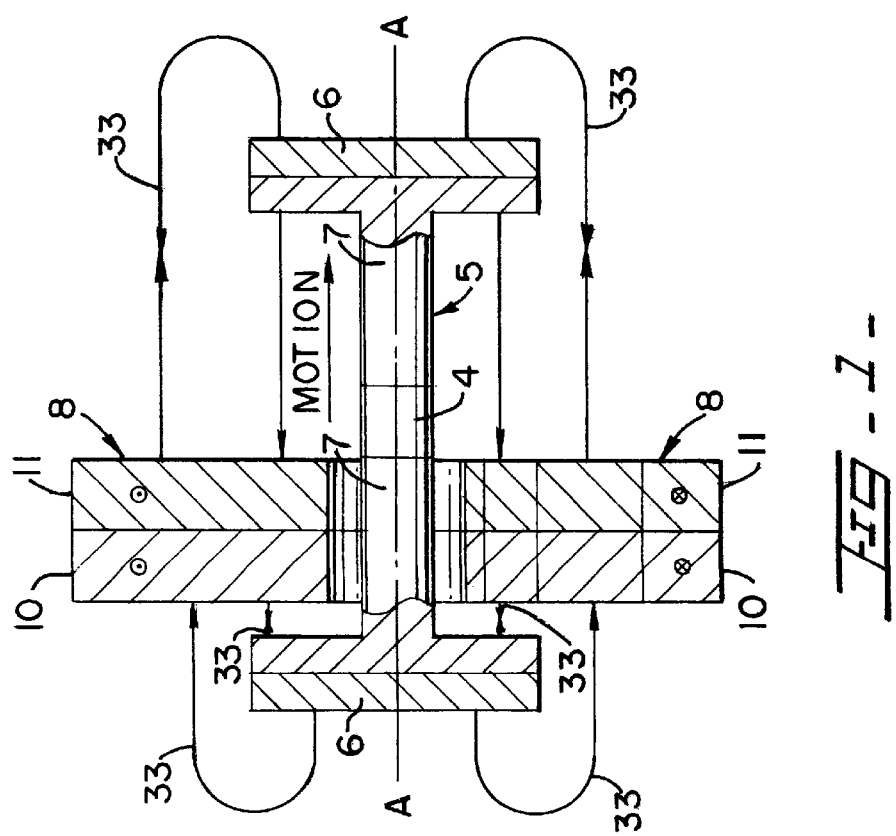
FIG-2-

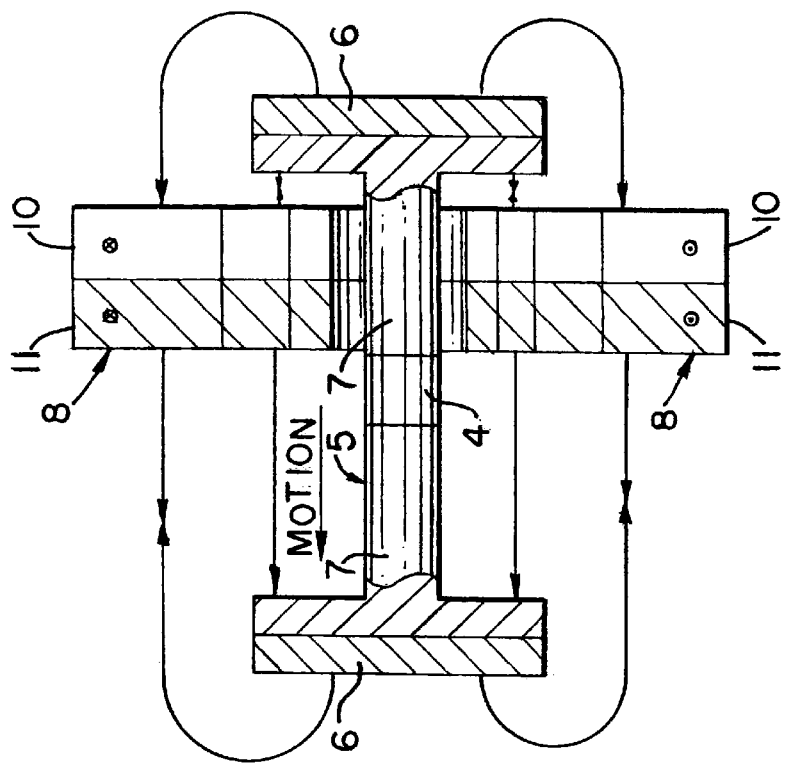
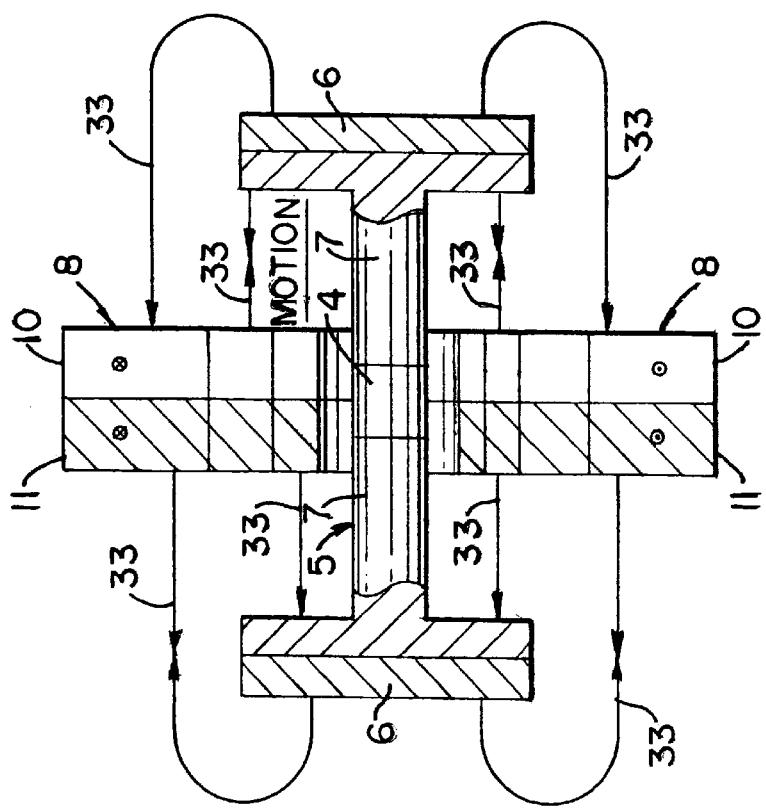

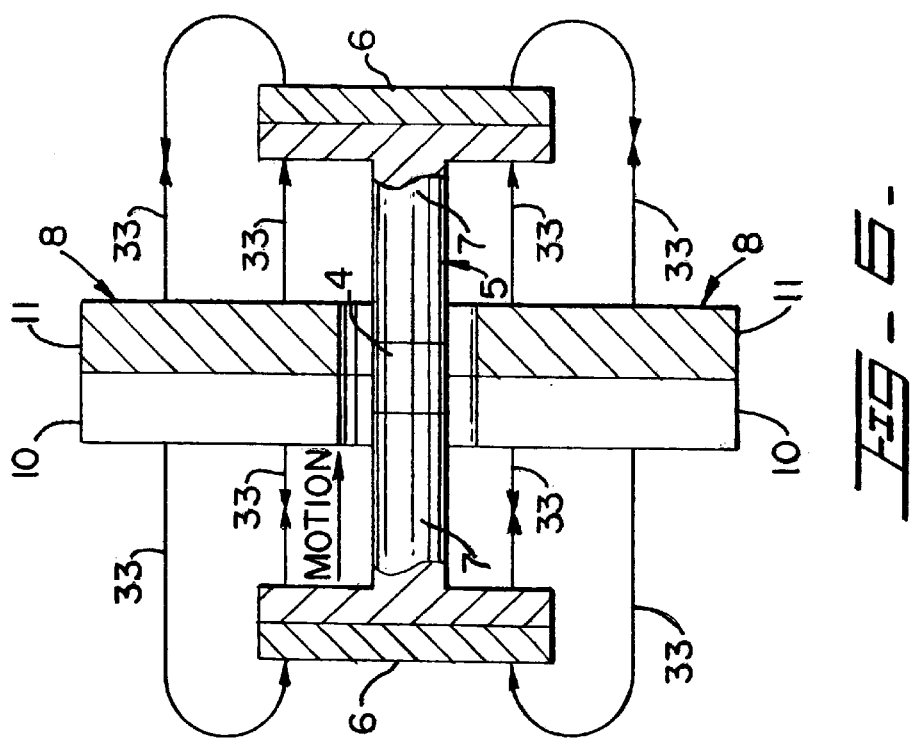
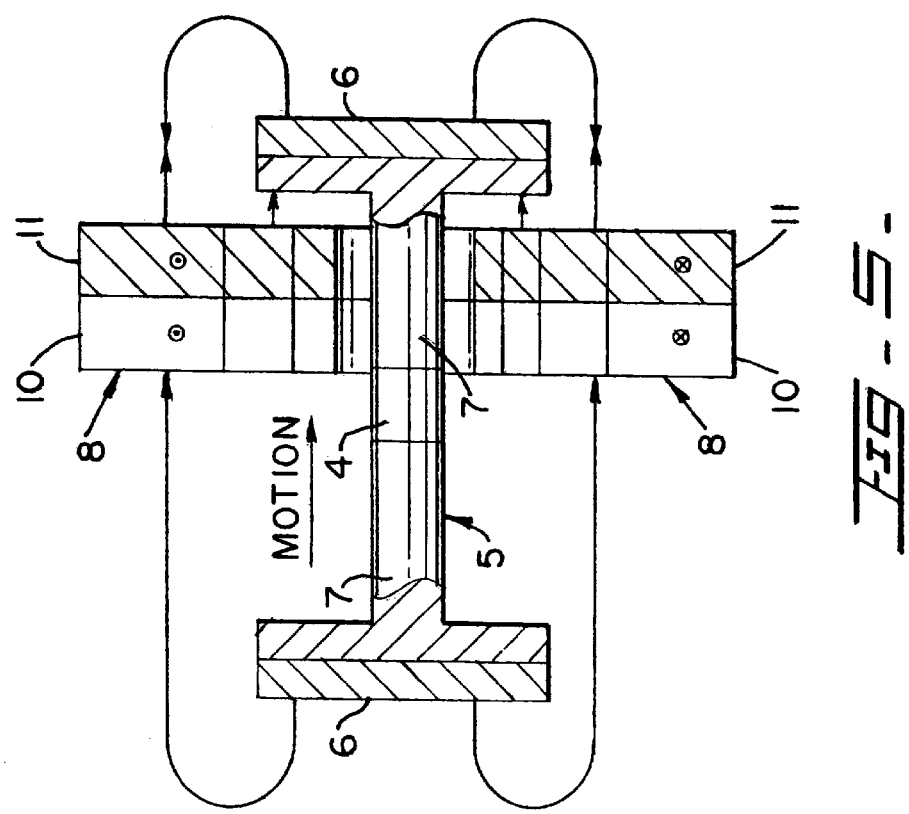

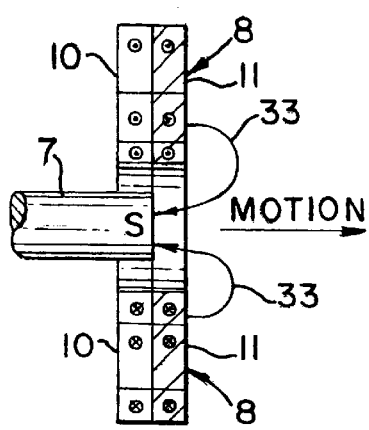
FIG-10-
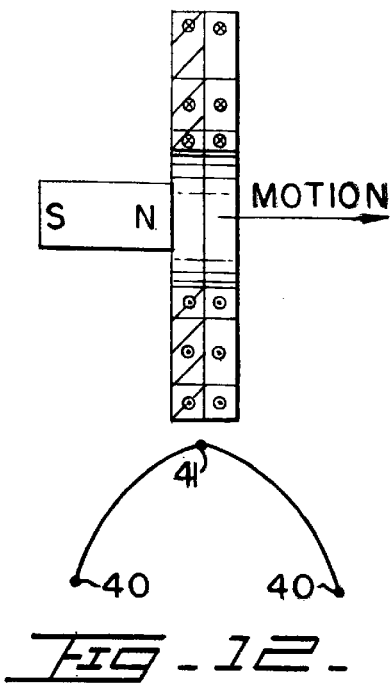
FIG-12-
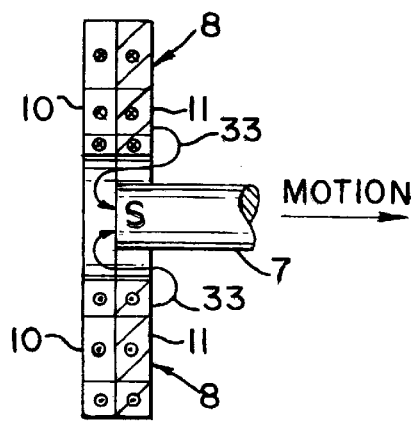
FIG-11-
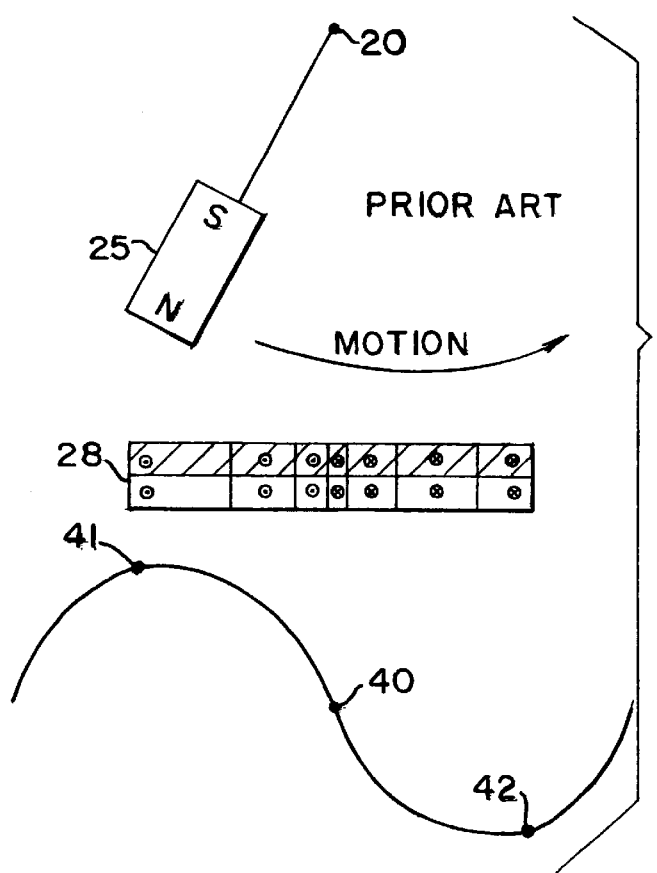
PRIOR ART
FIG-13-

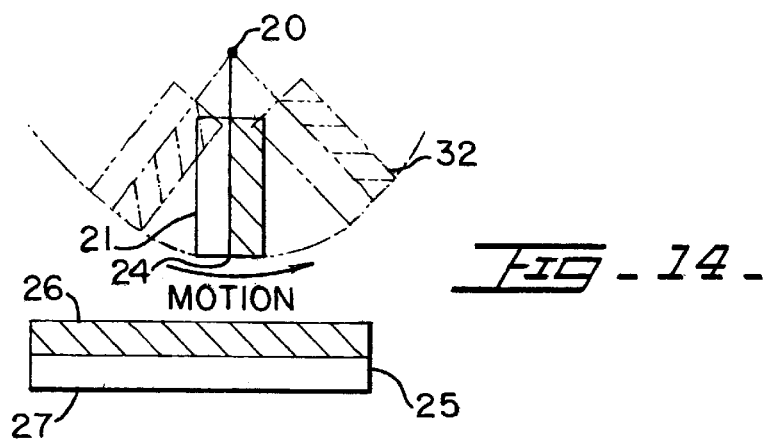
FIG-14-
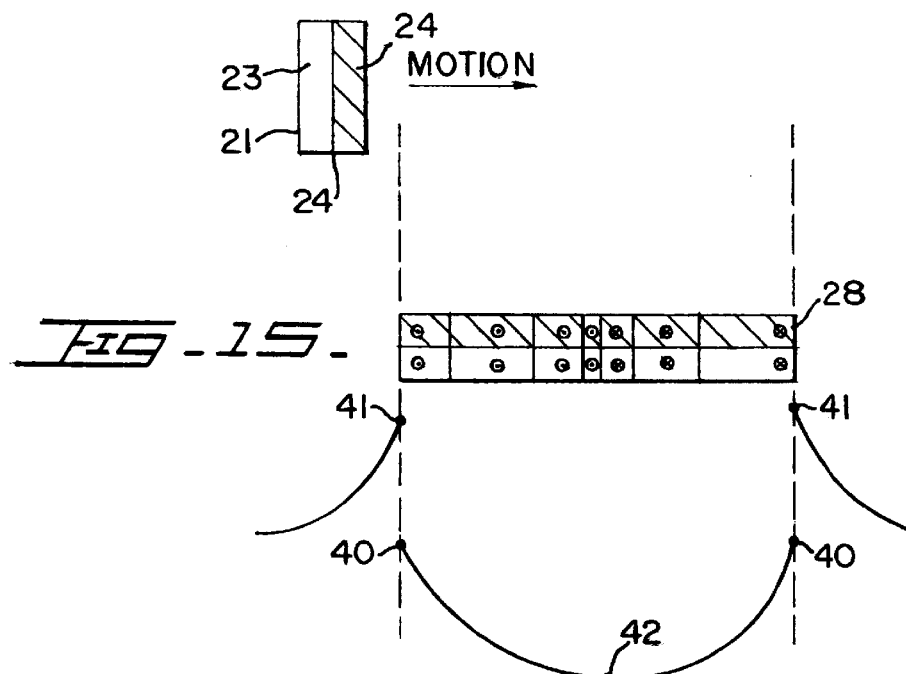
FIG-15-
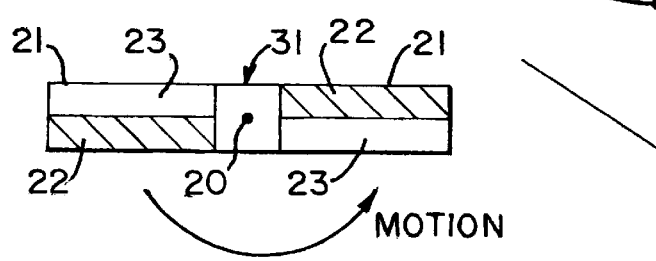
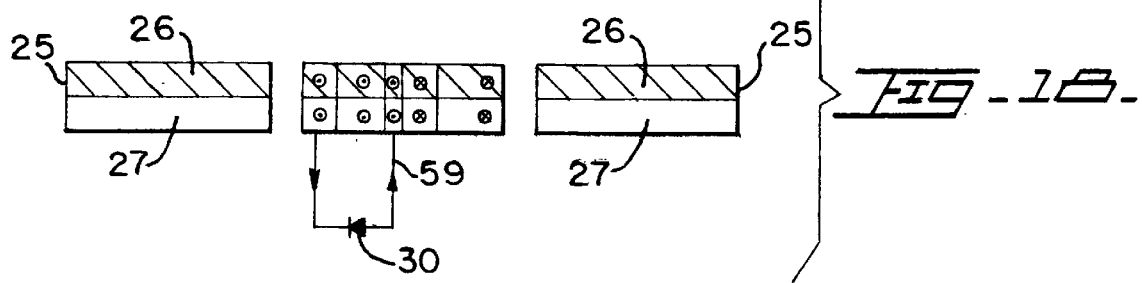
FIG-18-

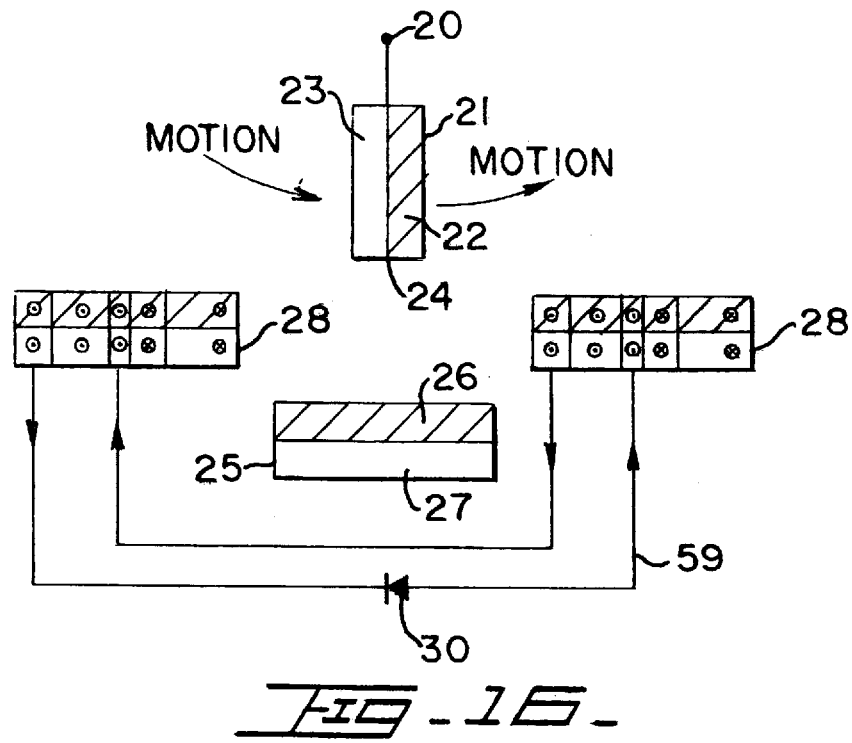
FIG-16-
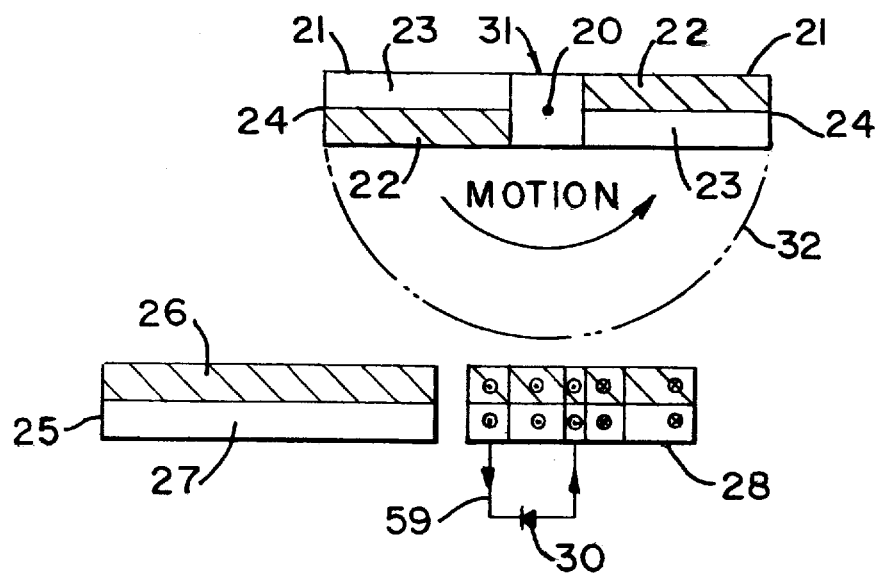
FIG-17-

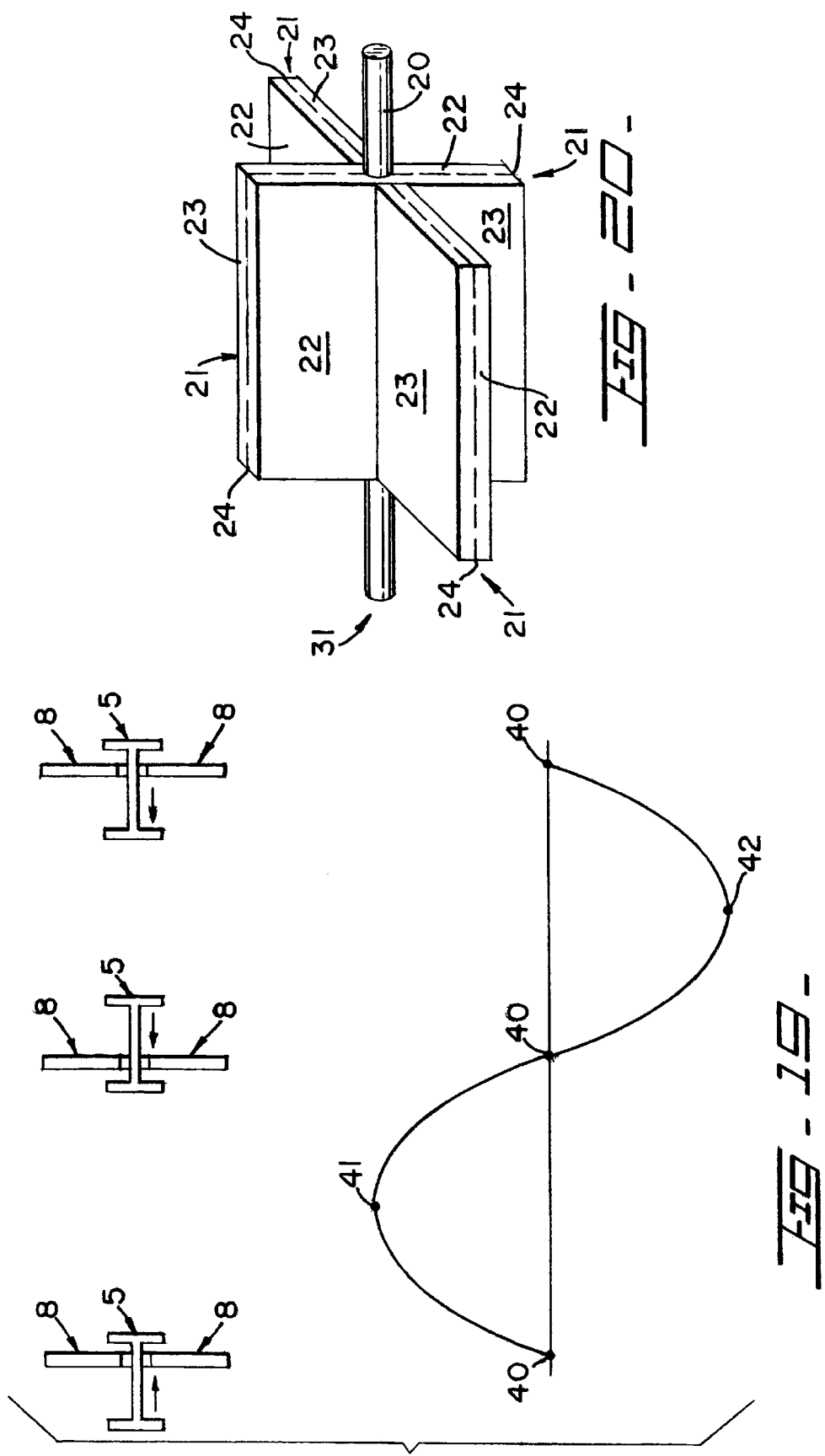

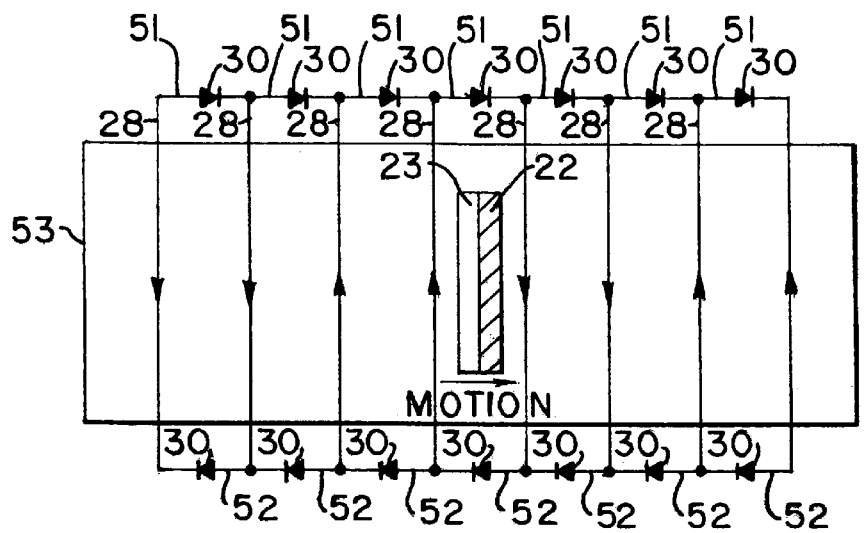
FIG-23-
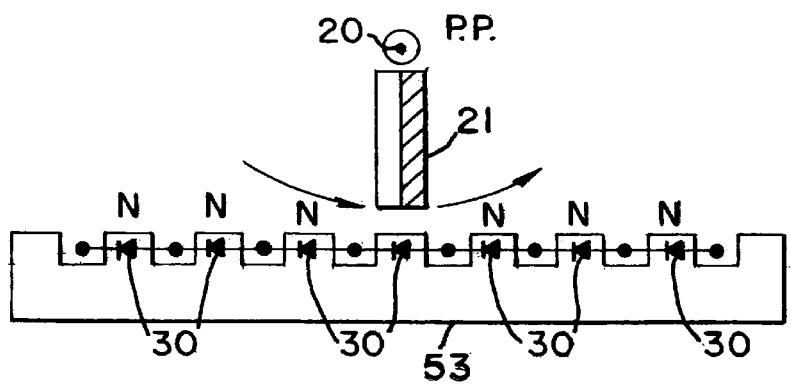
FIG-23A-
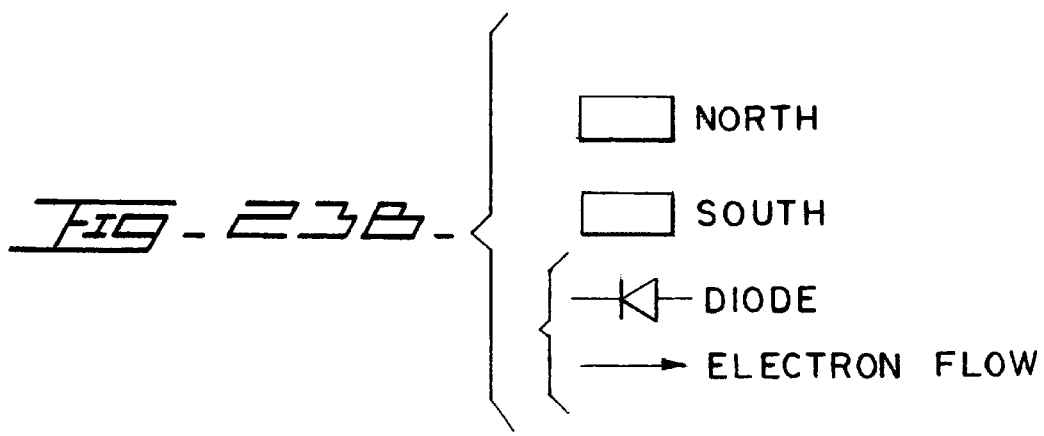
FIG-23B-

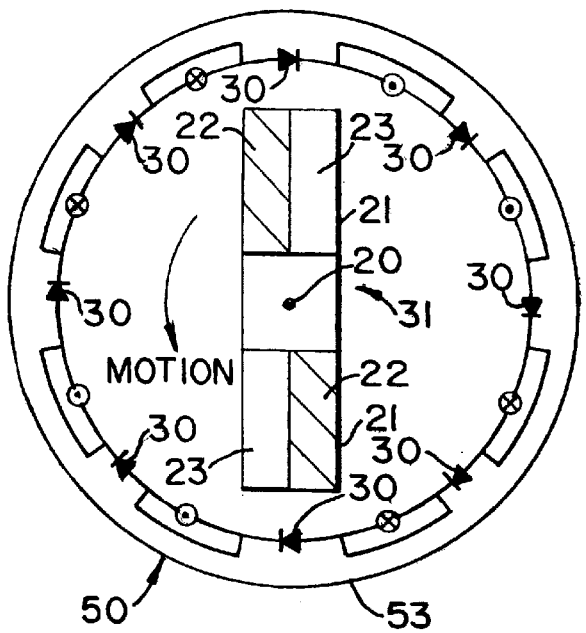
FIG-24-
FIG-26-
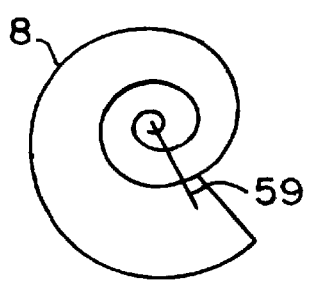
FIG-27-

MOTOR AND GENERATOR WHEREIN MAGNETISM AIDS MOTION

CROSS REFERENCES TO RELATED APPLICATIONS

This application claims the benefit of provisional patent application 60/062,008 having a filing date of Oct. 17, 1997.

BACKGROUND OF THE INVENTION

1. Field of the Invention

This invention relates to the fields of electric motors and generators.

2. Description of the Related Art

Kinetic energy is the energy of motion. Moving electrons like other moving matter contain kinetic energy. For example, electrons moving from negative to positive electrodes contain kinetic energy. Similarly, electrons moving between magnetic poles contain kinetic energy.

Electrons move from negative to positive electrodes creating a current. In addition, electrons flow from an area of high potential to an area of lower potential. A difference in potential is known as Electromotive Force (hereinafter "EMF"). Two points having a difference in electrical potential cause electrons to move to equilibrate the difference when connected by a conductor. A moving electron creates a magnetic field around itself. The direction of the magnetic field is governed by the right hand rule. The right-hand rule is a convention used to describe the direction of the resulting vector produced from the cross product of two vectors used to describe a rotation. In electromagnetism, the right-hand rule can be used to determine the direction of the magnetic field produced by a rotating electric charge. To use the right-hand rule, first curl one's right hand in the direction of the rotating current, then the thumb on the right hand points in the direction of the resulting magnetic north pole. Magnetic fields have a north pole and a south pole. A magnetic pole attracts a pole of opposite magnetic polarity. Conversely, two like magnetic poles repel each other.

Traditional generators capture the flow of electrons created by induction when a magnet is moved relative to a coil. According to Lenz's law, the polarity of the induced EMF tends to produce a current that will create a magnetic flux to oppose the change in magnetic flux in the loop. The basic configuration of all traditional generators is an application of Lenz's law. A magnet having two poles, one magnetically north and the other magnetically south, is aligned so that one pole is facing the coil, and, therefore, the other facing away from the coil. As the magnet is brought nearer the coil, the approaching magnetic field increases flux in the coil, which induces an electrical current that tends to oppose the change in flux in the coil. The direction of the current reverses as the magnet passes the center of the coil as the north pole moves away from the coil. This reversing current is an alternating current. The current is produced by an EMF. The current produces a magnetic pole like the approaching magnet's pole that tends to keep the flux through the loop constant, repelling the approach of the magnet. Conversely, as the magnet moves away, the magnetic field of the coil attracts the magnet. In both cases, the motion and the magnetic field are opposed. Because this EMF opposes a change in flux, it is referred to as "counter EMF".

Counter EMF works to resist motion in a motor and current flow in a generator regardless of which direction the magnet moves relative to the coil. As explained in the previous paragraph, counter EMF hinders the approach of a magnet towards a coil. In addition, as a magnet passes its closest point to a coil and begins to move away, the polarity of the magnetic field in the coil reverses. The result of the two opposite poles is that the near face of the magnet is attracted to the coil as it moves away from the coil. Again, the motion is opposed.

In generators and alternators of the prior art, like the one previously described, a counter EMF exists to resist a change in flux in a coil. As the magnet and the coil approach and a like magnetic pole is induced in the coil, the two poles magnetically oppose each other. As the magnet and the coil separate and an opposite magnetic pole is induced in the coil, the two opposing poles magnetically attract each other. In either case, the magnetic force is opposing the motion.

The counter EMF reduces the efficiency of the motor or generator. In traditional generators and alternators, the counter EMF opposes the motion in motors and the current in generators. In this way, energy is lost overcoming the counter EMF rather than moving the magnet and producing current.

Rotary designs of generators and motors are well known in the prior art. Rotary designs rely on the same principles of magnetic induction as reciprocating motors and engines. The current induced in the coil produces a magnetic field that opposes the rotational motion. This counter EMF, requires that motors and generators running with high loads or speeds must have more power input, resulting in a decreased efficiency.

SUMMARY OF THE INVENTION

This invention encompasses a more efficient electric motor and generator. The apparatus avoids the counter EMF problem, resulting in an electric motor or generator that has a higher efficiency.

To understand the invention, a step by step explanation is given.

The first concept is a system in which like-magnetic poles of magnets attract each other. By using two differently-sized magnets, a first larger magnet can be made to have one pole attract a second smaller magnet even though the smaller and larger magnets have like-magnetic poles facing each other. To demonstrate this, two magnets are forced together while they have like-magnetic poles facing each other. At a distance, the two magnets repel each other. As the magnets move close to each other, they eventually attract each other even though the like-magnetic poles face each other. Seemingly, this directly contradicts the principle that opposite poles attract and like poles repel. However, upon viewing the field lines as shown by iron filings, the "opposites attract principle" is still in effect. The field lines show that, at close range, the lines of magnetic force travel perpendicularly from the large magnet's face around to the rear of the small magnet where the small magnet's opposing pole is located. The distance at which the attractive and repulsive forces equal each other is known as the "dead point".

The next step is to measure the amount and direction of current produced as two like-magnetic poles are brought together in the manner described above. To demonstrate that current can be generated while magnets move in the direction of the EMF, the basic two magnet setup, described previously, is modified. The small magnet is modified by placing a terminal on the north-pole face and another terminal on the south-pole face of the small magnet; then a voltmeter is connected between the two terminals. The small magnet is maneuvered closer and farther from the larger magnet within a distance of the dead point; the magnets are arranged so a pair of like poles face each other. Despite the like poles facing each other, the magnets attract each other. As the magnets move in relation to each other, current begins to flow through the voltmeter. As the small magnet approaches, the opposite-magnetic pole on the small magnet's back is attracted to the opposite-charged face of the large magnet. As the small magnet is pulled away from the large magnet, the small magnet's back is still attracted to the opposite-polarity face of the big magnet. In addition, as the magnets are separated, the current flows in the opposite direction as when the magnets are moved toward each other. This supports that the motion of the magnets toward each other is aided by the electromagnetic force between the magnets while current is being produced.

To expand on the utility of the system, a reciprocating system capable of repeating must be constructed. To accomplish this, the next concept of how an electron flows through a conductor must be understood and simulated. To begin the analysis, picture an electron isolated in space. Because the electron is a negative electrical point charge, lines of magnetic force can be thought to be aiming at the electron. These lines of magnetic force can be simulated by surrounding a space with magnets having their south poles facing the electron. In this arrangement, the magnetic field lines from the south poles' respective north poles move toward the space, and then turn toward the south pole. Before they curve toward the south pole, the magnetic field lines all point at the space. The result is similar to an isolated electron in space.

When such an electron flows through a conductor, a magnetic field surrounds the path of the electron. As the electron flows through the conductor, a north pole immediately leads the electron and a south pole immediately follows the electron.

Examples showing the effects of an electron flowing through a conductor include the series of experiments where electrons were emitted through a thin gold foil. In these experiments, an electron gun emitted electrons into a thin gold foil. It is the applicant's opinion that the result was a ripple pattern on the gold foil similar to a drip of water into a pool of water. The rippling is caused by the interaction between the spherical magnetic field around the electron and the aluminum foil. The interaction begins as the electron approaches the foil. The moving electron creates a spherical electromagnetic field. The foil is repulsed by the field. Once the electron enters the gold foil conductor, the electron travels as described before. A magnetic field forms around the electron within the conductor and the electron essentially "falls down" a magnetic tube as it is drawn by the lead positive charge and pushed by the following negative charge. Finally, when the electron exits the gold foil, a north pole pulls the electron back toward the foil.

In applying the concept of an electron passing through a solid conductor to motors and alternators, an electron is simulated and passed through a magnet that is analogous to the conductor. Because, as previously stated, an isolated electron in space is effectively surrounded by magnetic south poles, an electron is simulated by surrounding a space with south poles. To build a simulated electron, a non-conducting spacer is placed between the two south poles; the spacer fastens to the south poles. The poles need to be connected because the two south poles repel each other.

The next step in understanding the invention is to pass the simulated electron through a simulated conductor. Because the simulated electron is a physical apparatus and not an infinitesimally small particle like an electron, the simulated electron cannot pass through a solid, like an electron. Instead, the simulated electron is placed through a hole made in the center of the conductor. If the diameter of the hole is small enough compared to the size of the simulated electron, then a magnetic field will still be created in the surrounding coil. And, like the solid conductor in the gold foil experiments, the simulated electron will "fall down" the electromagnetic tube created in the coil. This motion of the simulated electron through the coil can be used to aid the motion in a motor or generator.

Next by combining the two concepts of 1) forcing like-magnetic poles to attract and 2) passing an electron through a conductor, an electrical motor or generator, wherein the motion is aided by the counter EMF and its complementary current and magnetic field.

To combine the two ideas, a piston is made out of two connected permanent magnets, hereinafter referred to as "dipoles". Each dipole looks like half of a dumbbell with a larger outside pole and a smaller inside pole. Both fat outside poles have the same magnetic polarity. Both thin inside poles have the same magnetic polarity. The outside poles and inside poles have opposite magnetic polarity. The thin end of one of the dipoles is then passed through the center hole of a coil. Once inserted, the like-charged, inside poles of both dipoles are connected by an insulated spacer to form a piston with a simulated electron at its midpoint. A current is passed through the coil. The current creates a magnetic field according to the right-hand rule. The dumbbell shape of the piston, namely the large outside poles, causes the magnetic field of the coil to extend perpendicularly from the coil, beyond the outside poles after which the magnetic field reverses to intersect perpendicularly with the surfaces of the outside poles to attract the outside pole of the piston. Then, as the piston begins to move due to the attraction to the coil, the simulated electron midpoint begins to pass through the center of the coil. As the simulated electron moves through the coil, an electron moving through a conductor is simulated. As the piston moves in relation to the ring, current is induced in the coil that is in phase with the current. The result is an apparatus that produces current while the motion is aided not hindered by the induced magnetic field.

To improve the apparatus, the coil can be a band coil. A band coil is made of a conductor such as aluminum or iron. To build this kind of coil, a sheet of conductor is rolled over itself equatorially into a coil. The center of the coil can have a hole through which a piston can pass. Each end of the coil is connected electrically to complete a circuit. A load can be inserted in the circuit to make use of the current. A diode can also be inserted to regulate the direction of the current. The sheet is made so that its thickness steadily increases from thinner to thicker. The thin end is kept in the center during rolling. Because each turn of the coil is thinner in the core relative to the exterior, a higher "turn ratio" exists in the center of the coil than at the outside (turn ratio is defined as the number of coils per unit of thickness). The different turn ratios, generate a higher EMF in center than outside. By connecting the ends of the coil to each other a circuit is created. Then, due to the difference in EMF, current flows from the area of high potential near the coil to the area of low potential near the exterior of the coil. The flowing current that rotates through the turns of the coil creates a complementary electromagnetic field according to the right hand rule. The magnet is painted with insulating paint to reduce eddy currents along the laminations. The magnet is then wrapped in fiberglass.

The final step is to make a motor or generator that reciprocates. To make a motor, a current is passed through the coil, then, according to the right-hand rule, one face becomes a magnetic north pole and the other a magnetic south pole. To make a reciprocating piston, the coil is connected to an alternating current. As the current alternates, the polarity of each face of the coil alternates north to south and south to north. This alternating polarity of the coil causes the piston to move back and forth in phase with the alternating current because, as the polarity alternates, the outside poles of the piston are alternately attracted and repelled. This motion of the piston can be harnessed by connecting the piston to a mechanical power means such as a crankshaft and flywheel. As the piston moves, the EMF induced in the coil is in phase with the alternating current so it helps to keep the piston moving. Once started, the power is added in phase to the alternating current inputted, so the inputted alternating current can be reduced.

A generator can be produced using the same apparatus as above but reversing the process. By employing a mechanical starter such as a starter or flywheel, mechanical energy from an outside source is used to rotate a flywheel. The flywheel is connected to the piston by a cam. As the spinning flywheel starts the piston reciprocating back and forth, the piston moves back and forth through the coil, inducing a current in the coil. The direction and amount of current is a sine function based on the motion of the piston. The distance that the piston travels is known as the throw. The throw is short enough that the piston never travels wider than the deadspots of the coil. The deadspots are the distance from the coil, after which, the coil repels the piston rather than attracting. As the piston changes direction, the direction of the current changes. In this way, an alternating current that alternates with the same frequency as the piston's direction is produced. In addition, the alternating current produced creates a magnetic field that aids the motion as previously described.

A second embodiment of the working motor uses a rotor rather than a reciprocating piston. In the rotary embodiment, a magnetic fin is attached to a central axis. The fin rotates around the central axis. The magnetic fin has two faces: one with a magnetic north pole, the other with a magnetic south pole. A plane called the seam divides the fin so that one face is on one side of the seam and the other face is on the other side of the seam. The fin is connected to the axis along the seam. As the fin rotates around the axis, the face leading the motion is referred to as the leading face while the face trailing the movement is the trailing face. The leading face and trailing face have opposite polarities.

One or more fins can be arranged around the axis. To insure constant rotation, the fins should be placed symmetrically around the axis. All of the leading faces of the fins should have the same magnetic polarity. Likewise, all of the trailing faces of the fins should have the same magnetic polarity.

As the fins rotate around the axis, the fin's rotating outer edge defines a circular perimeter. A coil is placed tangentially to the perimeter. The plane of the coil should be perpendicular to the fin when the fin is rotationally closest to the coil. The coil is placed at a spaced distance that is close as possible to said rotor without touching said rotor in order to maximize the effects of the interacting magnetic fields of the coil, adjacent the magnet and fin.

A magnet is located adjacent to the coil. The magnet is on the side of the coil from which the rotating fin comes. The magnet has an inward and outward face; the inward face is closest to the axis and the outward face is furthest from the axis. The inward face has the same magnetic polarity as the leading face of the fin.

As the fin approaches the magnet, the magnetic forces between the like-magnetic poles of the inward face and leading face, and the opposite-magnetic poles of the inward face and the trailing edge, force the fin toward the adjacent coil. As the fin approaches the coil, a current in a first direction is induced according to the right-hand rule in the coil. As the fin crosses the perimeter defined by the coil, the direction of the current produced reverses. Then, as the fin moves away from the coil, the current in the coil is again in the original direction. The current produced is therefore alternating.

Without more, the coil would still produce a counter EMF that would create a current in the coil and a complementary magnetic field that would oppose the rotation of the fins. In the rotational embodiment, the current induced into the coil produces a complementary magnetic field that repels the leading edge of the fin as it approaches and attracts the trailing edge as it moves away from the coil. To prevent counter EMF, a means to prevent reverse flow is added. Example of means to prevent reverse flow include a diode added to the coil that allows current to flow in only one direction through the coil. Another example is a shaft encoder which opens the circuit in the coil whenever the axis is positioned so that a fin is inside the cylindrical perimeter projection of the coil. By preventing the reverse flow of current, no magnetic field is produced that hinders the rotation of the rotor. The resulting current is pulsed direct current. A plurality of fins and coils can be placed around the axis so that the current produced in each coil is in-phase to raise the amperage or out-of-phase with the other coils, so that, effectively, a non-pulsating direct current is produced.

A mechanical power means can be attached to the axis. In a motor, the mechanical power means harnesses the rotational kinetic energy of the axis. In a generator, the mechanical power means helps to rotate the rotor to facilitate the creation of pulsating direct current.

The described rotational embodiment of a motor produces a rotation of the rotor that is not impeded by a counter EMF in the coil. Similarly, the described rotational embodiment of the generator produces a pulsating direct current while the motion of the rotor is not impeded by the counter EMF and its related current and magnetic field.

Another apparatus in which the generation of energy aids motion is a rotary embodiment utilizing "bus bars". This embodiment utilizes a rotor like the ones previously described in which a fin is connected to an axis wherein the fin has a leading magnetic face and an opposite-polarity trailing face. As the fins rotate around their axis, a perimeter is defined by the position of the outer edge of the fin. A bus bar is placed around the perimeter. The bus bar comprises a series of coils placed adjacent to each other (end-to-end, not stacked). As the fin approaches and retreats from coils of the bus bar, a change in the electrical flux through the coil occurs. A change in flux occurs because the strength of the magnetic field of a magnet is changing as the strength of the field is inversely proportional to the square of the distance from the magnet ($\epsilon \approx 1/d^2$); the distance, and therefore magnetic field, changes as the fin rotates. The result is that coils further from the magnet have a lower EMF than coils close to the magnet. The relative potential difference between close and distant coils, causes a current to flow from the area of high potential to low potential. As the current travels in a circular path around the perimeter of the coils, a magnetic field, like the leading face, is created both before and after the fin. This causes the fin to rotate. Due to the symmetry of the rotor and surrounding bus bar, the rotor and its leading face continually are lead and followed by like-magnetic poles.

The coils used in the bus bar can include laminated iron cores to increase the magnetic induction.

Each side of each coil should include a diode that limits current flow to one direction. All of the diodes on one side of each coil should face in one direction while all the diodes on the opposing side should face the other direction. This promotes the circular flow of current.

BRIEF DESCRIPTION OF THE DRAWINGS

FIG. 1 is a side cutaway view of a reciprocating piston embodiment in an initial, rightmost position.

FIG. 2 is a side cutaway view of a reciprocating piston embodiment wherein the current and magnetic field of the coil and the motion of the piston have reversed relative to FIG. 1.

FIG. 3 is a side cutaway view of a reciprocating piston embodiment wherein the piston has moved to the center of the coil.

FIG. 4 is a side cutaway view of a reciprocating piston embodiment wherein the piston has moved to its leftmost position.

FIG. 5 is a side cutaway view of a reciprocating piston embodiment, wherein the current and magnetic field of the coil, and motion of the piston have reversed relative to FIG. 4.

FIG. 6 is a side cutaway view of a reciprocating piston embodiment wherein the cycle shown in FIGS. 1–6 is completed by the piston moving to the center of the coil.

FIG. 10 is a side cutaway view of a simulated electron entering a magnet with a hole in the center of the magnet.

FIG. 11 is a side cutaway view of a simulated electron leaving a magnet with a hole in the center of the magnet.

FIG. 12 is a side cutaway view of a traditional prior art piston moving through a coil and the resulting change in current direction shown below.

FIG. 13 is a side cutaway view of a prior art rotational generator and the resulting current plotted versus position of the fin.

FIG. 14 is a side view of a rotating magnet near a perimeter magnet located around the perimeter of the rotating magnet that depicts a magnet with its initial position and resting position shown in phantom.

FIG. 15 is a side cutaway view showing a fin passing a coil and the resulting current plotted versus position shown below.

FIG. 16 is a side cutaway view of a magnet as it rotates over a magnet that is located between two coils.

FIG. 17 is a side cutaway view showing two fins rotating over a coil that is adjacent to a magnet.

FIG. 18 is a side cutaway view of a rotating embodiment having a coil located between two magnets.

FIG. 19 is a side cutaway view of a reciprocating piston showing the position of the piston relative to the current in the coil shown below.

FIG. 20 is a perspective view of the rotor.

FIG. 23 is a side cutaway view of a bus bar embodiment.

FIG. 23a is an elevational view of FIG. 23.

FIG. 23b is a legend.

FIG. 24 is a top view of a bus bar embodiment.

FIG. 25 is not used.

FIG. 26 is a side view of a sheet of aluminum with increasing thickness.

FIG. 27 is a side view of a band coil.

DETAILED DESCRIPTION OF THE PREFERRED EMBODIMENTS

Figure 7:
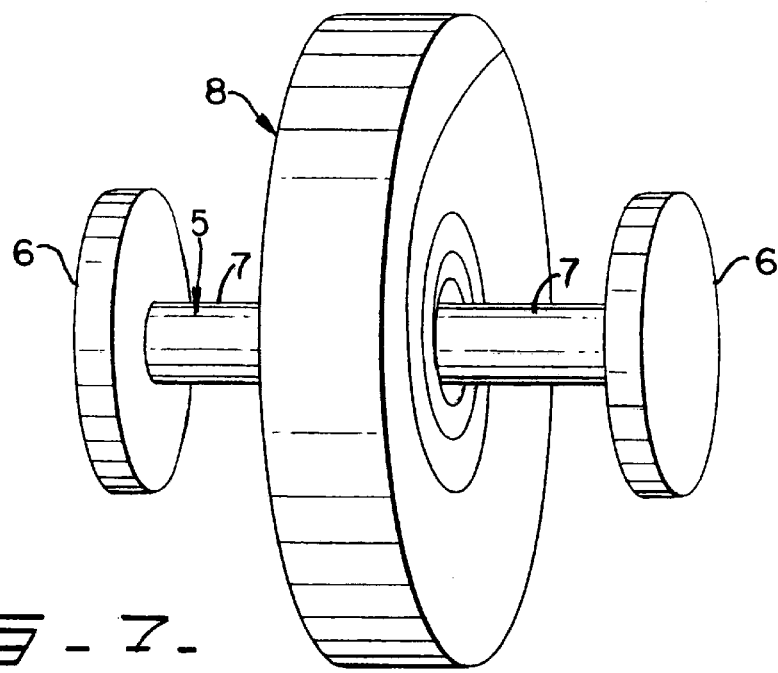
FIG. 7 is a perspective view of a reciprocating piston embodiment.
Figure 8:
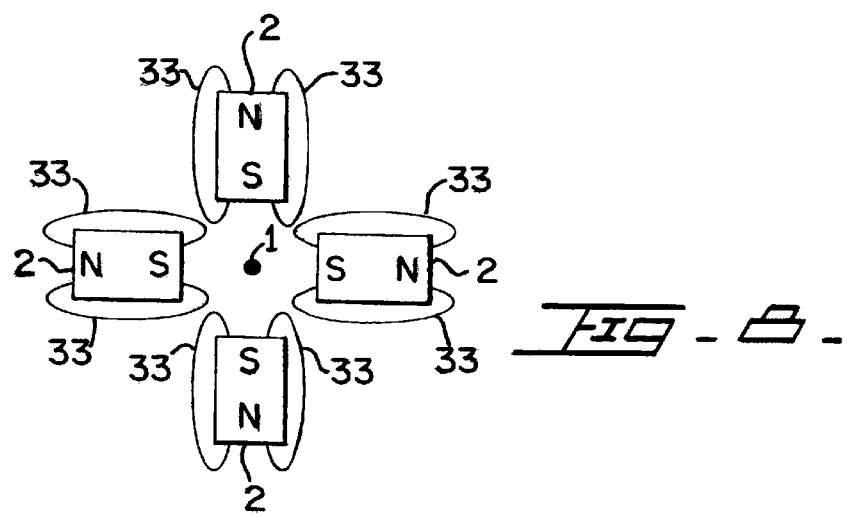
FIG. 8 is a model illustrating an isolated electron.

FIG. 8 is a model depicting electron 1 isolated in space. Electron 1 has a negative charge. Because electron 1 has a negative charge, isolated electron 1, in effect, is surrounded by a plurality of relative south poles 2 having magnetic field lines extending toward electron 1 before they turn to meet south poles 2.

FIGS. 10 and 11 show a simulation of an isolated electron as it passes through a coil. The electron is simulated by magnetic south pole 7. The conductor is simulated by coil 8. FIG. 10 depicts magnetic pole 7 which is a south pole as it enters coil 8. FIG. 10 shows that when the leading edge of pole 7 is brought inside the field of coil 8, pole 7 is pushed through, past opposite face 11 to the other edge of coil 8.

Figure 9:
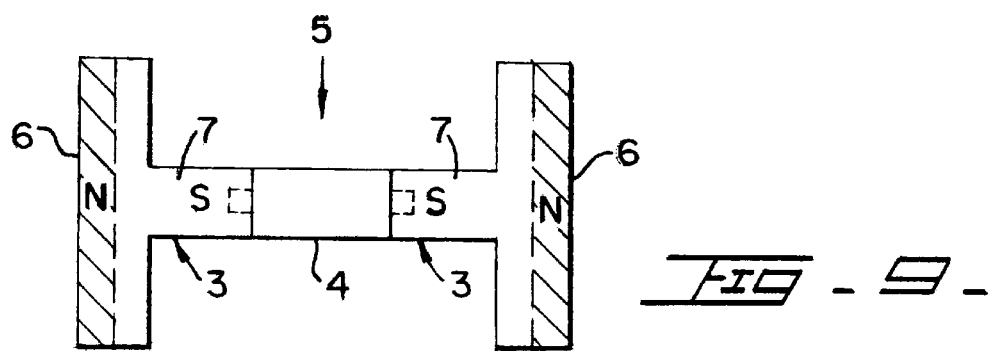
FIG. 9 is a piston.

In FIG. 9, to make a piston that simulates an isolated electron, two dipoles 3 are connected by a connection means 4. Connection means 4 is a screw that threads into each dipole 3. Connection means 4 is made of an insulator. Connection means 4 separates dipoles 3 from each other and acts as a spacer between dipoles 3. Dipoles 3 each have two ends 6 and 7. One end is a north-magnetic pole 6. The other end is a south-magnetic pole 7. Preferably, each end is a concentric, adjacent cylinder having different diameters. The end with the larger diameter is outside end 6. The end with the smaller diameter is inside end 7. Both outside ends 6 have like-magnetic polarities. Both inside ends 7 have like magnetic polarities. Connection means 4 is used to make joined like-magnetic poles by connecting either a magnetic north pole to a magnetic north pole, or a magnetic south pole to a magnetic south pole. Connection means 4 is screwed into inside ends 7 and has sufficient strength to withstand the repulsive magnetic forces between like-magnetic inside ends 7. The ends that connect are inside ends 7. Outside ends 6 are the ends on each dipole 3 that are not connected to the other dipole 3.

Figure 22:
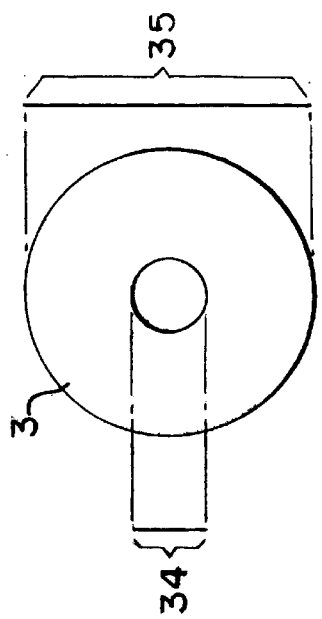
FIG. 22 is a top view of a dipole.
Figure 21:
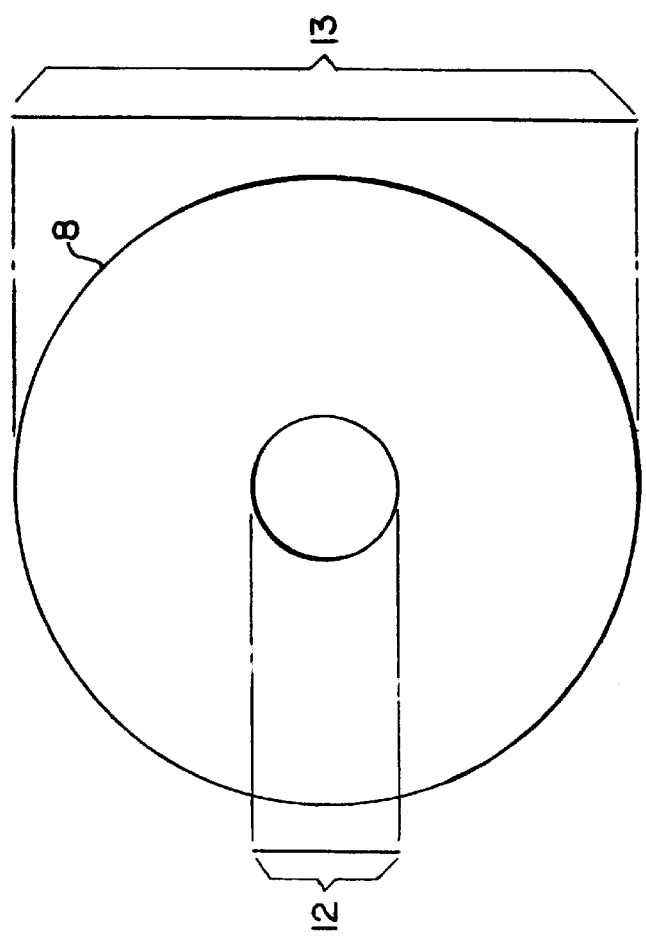
FIG. 21 is a top view of a magnetic ring.

FIGS. 1–7 depict a reciprocating piston embodiment. In this embodiment, piston 5 is similar to the one described above. Piston 5 is surrounded by coil 8. Coil 8 is a short, circular solenoid having a tube-shaped laminated iron core. Coil 8 has an inner diameter 12 and outer diameter 13. Inner diameter 12 of coil 8 is wider than the diameter 34 of inside ends 7 but narrower than the diameter 35 of outside ends 6; and outside diameter 13 of coil 8 is wider than diameter 35 of outside end 6 (see FIGS. 21 and 22).

By constructing and arranging piston 5 and coil 8 as previously stated, coil 8 extends a greater distance from axis A—A than outside pole 6. This configuration promotes the magnetic attraction and repulsion between coil 8 and outside poles 6 by allowing the magnetic field 33 to extend orthogonally to faces 10 and 11 of coil 8 and reverse direction interact orthogonally with outside poles 6. In addition, by having diameter 34 of inside poles 7 be less than inside diameter 12 of coil 8, piston 5 is free to reciprocate in coil 8.

Coil 8 is an electromagnet. When a current, is passed through coil 8, a magnetic field is created with a magnetic polarity dictated by the right hand rule. The magnetic field creates a like magnetic face 10 and an opposite magnetic face 11 in coil 8. Like magnetic face 10 magnetically attracts the oppositely-charged outside pole 6 that like magnetic face 10 faces. The motion of piston 5 and magnetism are aligned.

When coil 8 is connected to electrical starting means such as an alternating current, the magnetic polarity of each face 10 and 11 of coil 8 will alternate with the direction of the current (see FIGS. 1 and 2; and FIGS. 5 and 6). The magnetic polarity of faces 10 and 11 alternates with the direction of the current according to the right-hand rule. The alternating polarity of coil 8 causes piston 5 to reciprocate in phase with the alternating current. Piston 5 reciprocates in phase with the alternating current because outside poles 6 of piston 5 are alternately attracted and repelled by coil 8 as the magnetic polarity of faces 10 and 11 alternate with the current.

The reciprocating cycle is shown in FIGS. 1–6. In FIG. 1, an alternating current flows in a first direction through coil 8 forcing piston 5 to the right. In FIG. 2, the direction of the alternating current has reversed; the polarity of coil 8 is thereby reversed as is the direction of piston 5. In FIG. 3, the direction of the current is maintained as is the resulting polarity of coil 8, and piston 5 continues moving to the left. In FIG. 4, the direction of the current is maintained, as is the resulting polarity of coil 8, and piston 5 continues moving to the left. In FIG. 5, the direction of the alternating current has reversed, the magnetic polarity of coil 8 is thereby reversed, and piston 5 moves right. In FIG. 6, the direction of the current is maintained, the magnetic polarity of coil 8 is also the same, and piston 5 continues to move in the same direction. After the position shown in FIG. 6, the cycle of FIGS. 1–6 is repeated.

The reciprocating piston can be connected to a mechanical energy output means (not shown), such as a flywheel (not shown), to harness useful work from the reciprocating motor.

Figure 29:
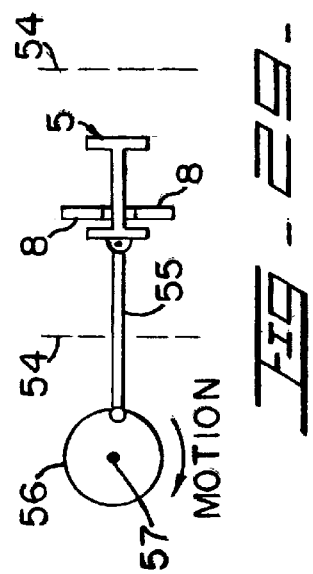
FIG. 29 is a side cutaway view of a reciprocating piston connected to a flywheel where the piston is at its rightmost position.
Figure 28:
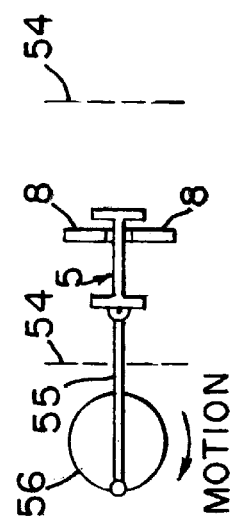
FIG. 28 is a side cutaway view of a reciprocating piston connected to a flywheel where the piston is at its leftmost position.

In an apparatus similar to the above-described motor, a generator can be made from the reciprocating piston embodiment. To make a generator, a mechanical starting means such as hydroelectric turbine, steam engine, or starter motor is connected to a flywheel. Piston 5 reciprocates as flywheel 56, see FIGS. 28 and 29. Flywheel 56 contains a reverse means that causes the direction of piston 5 to reverse at the limits of the throw. The throw is the distance that piston 5 travels. In flywheel 56, the reverse means is cam 55 attached to piston 5 and to flywheel 56. The angular momentum of flywheel 56 causes flywheel 56 to continue rotating in the same direction as piston 5 reverses direction. The throw is equal to twice the distance from the center 57 of flywheel 56 to the location where cam 55 is attached. Without a reverse means, piston 5 would travel in its initial direction, collide with coil 8, and cease reciprocating. Similarly, in a motor, if direct current runs through coil 8 rather than alternating current, piston 5 would move in an initial direction, collide with coil 8, and never reciprocate. The magnetic field of coil 8 defines dead points 54. Dead points 54 are defined as the distance from coil 8 that outside ends 7 of piston 5 are equally repelled and attracted to coil 8. The throw is limited so outside ends 7 never travel wider than their respective dead points 54.

As piston 5 reciprocates, piston 5 which is a magnet moves through ring 8 that contains coil 8. As the magnet in piston 5 moves relative to ring 8, the magnetic flux in coil 8 changes. A change in magnetic flux creates an EMF in coil 8. The EMF induces a current in coil 8. The current in coil 8 induces a magnetic field in coil 8 whose direction is dictated by the right-hand rule. The magnetic field of coil 8 aids the motion of piston 5. The direction of the current in coil 8 reverses with the direction of piston 5. The current produced therefore is alternating current that cycles in phase with the motion of piston 5 (see FIG. 19). The current produced is captured by an electrical output means such as a capacitor, resistor, light, motor, or other load.

FIG. 19 depicts the relationship between the position of piston 5 and the direction of the current. The plot shows the current direction relative to piston position depicted above the plot. Zeroes 40 occur where current direction changes and coincide with the position where the direction of piston 5 changes.

An alternative to the reciprocating piston that employs the same underlying principles is a rotational embodiment. FIG. 20 rotor 31. Rotor 31 includes axis 20 that rotates. Attached around axis 20 are fins 21. Fin 21 has leading face 22 having one magnetic polarity and trailing face 23 having the opposing magnetic polarity to leading face 22. Seam 24 is the location on fin 21 where leading face 22 and trailing face 23 join. Fin 21 is joined to axis 20 along seam 24. Fin 21 rotates around axis 20 as axis 20 rotates.

FIG. 14 shows rotor 31 whose motion is aided by surrounding magnets. As rotor 31 rotates, fin 21 defines a circular perimeter 32. Magnet 25 is located tangentially along perimeter 32. Magnet 25 is a permanent magnet wherein the magnetic domains are fixed unlike an electromagnet wherein the magnetic domains depend on a current. Magnet 25 has two faces of opposing magnetic polarity: inside face 26 and outside face 27. Inside face 26 faces the axis 20. Inside face 26 has the same polarity as leading face 22. Fin 21 that is over magnet 25 is forced by the magnetic force between 21 and magnet 25 toward the position shown in phantom by the magnetic fields of magnet 25 and fin 21.

FIG. 15 shows fin 21 as it rotates by coil 28. Coil 28 comprises a plurality of conducting loops connected in series. Coil 28 is tangential to perimeter 32 formed by fin 21 as it rotates about axis 20. Coil 28 is a spaced distance from fin 21 that is as close to rotor 31 without touching rotor 31. Fin 21 magnetically induces a current in coil 28 as it approaches coil 28. The direction of the current reverses as fin 21 is within a perimeter projection 32 of coil 28. The alternating current produced as fin 21 passes coil 28 is shown below the coil on FIG. 15. The plot shown below the apparatus depicts the current direction relative to the position of fin 21 over coil 28. As fin 21 approaches coil 28, the current increases and peaks at maximum 41, as fin 21 crosses perimeter 32 the current reverses and increases from zero 40 at perimeter 32 to minimum 42, as fin 21 moves from the center of coil 28 toward perimeter 32 the current decreases and reaches zero 40 at perimeter 32; the current direction reverses at perimeter 32 and decreases as fin 21 moves away from coil 28.

The embodiment shown in FIG. 15 contrasts the prior art rotational embodiment shown in FIG. 13. The prior art generator shown in FIG. 13 comprises magnet 25 having one pole near axis 20 and the other pole 23 away from coil 28 and the other pole is away from axis 20 and near coil 28. As magnet 25 rotates past coil 28, a current is induced in the coil. The current and direction is plotted below coil 28. The current increases as magnet 25 approaches coil 28, reaches maximum 41 as magnet 25 begins to cross coil 28, reverses direction at zero 40 when magnet 25 crosses the center of coil 28, reaches minimum 42 as magnet 25 crosses the edge of coil 28, and moves toward zero as magnet 25 moves away from coil 28. The prior art generator produces a counter EMF that creates a current in the coil and a complementary magnetic field that impedes the motion of magnet 25. The magnetic field produced pushes magnet 25 away from coil 28 as magnet 25 approaches the center of coil 28. The counter EMF reverses direction and produces an opposite-polarity magnetic field that attracts magnet 25 as magnet 25 moves away from the center of coil 28. In either case, the counter EMF in the prior art generator impedes the motion and reduces the efficiency.

FIG. 16 shows an embodiment using a plurality of coils 28. Coils 28 are alternated with magnets 25 generally tangentially around perimeter 32 formed by fin 21 as fin 21 rotates about axis 20. Coils 28 are connected to each other in series. Diode 30 is added to the coil circuit to prevent current flowing in reverse whenever fin 21 is within perimeter projection 32 of coil 28. By preventing reverse current, the counter-EMF cannot create a current or a magnetic field that opposes the rotation of rotor 31. Magnet 25 is arranged so inside face 26 has the same magnetic polarity as leading face 22. A mechanical power means can be attached to axis 20 to utilize the rotational kinetic energy of rotating axis 20 and fins 21. Alternately, pulsating DC is produced as the fins rotate around axis 20 departing or approaching coils 28.

FIG. 17 depicts an embodiment wherein two fins 21 are symmetrically located around axis 20. Coil 28 is adjacent to magnet 25. Coil 28 contains diode 30 that prevents a reverse current from being induced whenever fin 21 is within perimeter projection 29.

A motor can be made from the rotational embodiment of the invention. A mechanical power means (not shown) such as a drive shaft or gears can be connected to axis 20. As rotor 31 spins, the mechanical power means is driven.

A pulsating DC generator can be made from the rotational embodiment that includes coil 28 having diode 30 or a shaft encoder. A pulse of direct current is made as fin 21 approaches coil 28 and ends as fin 21 enters perimeter projection 32. A second pulse of direct current is produced as fin 21 exits perimeter projection 32 and moves away from coil 28. If a plurality of coils 28 are arranged out of phase from each other, a direct current without pulses can be produced by aligning the pulses out of phase with each other. These pulsating and non-pulsating direct currents can be used to power a variety of electronic devices.

FIGS. 23 and 24 show a bus bar embodiment. Fin 21 rotates about axis 20 and has leading face 22 and opposite-magnetic trailing face 23. Fin 21 is surrounded by bus bar 50. Bus bar 50 contains a plurality of coils 28 arranged adjacent to each other. Each coil 28 has two sides 51 and 52 that do not overlap the adjacent coil. Side 51 has diode 30 that allows current flow in one direction while side 52 has diode 30 that allows current in the opposite direction. Coils 28 wrap a laminated iron core 53.

To cause the bus bar embodiment to work, a starter (not shown) initiates the rotation of axis 20. Once started, rotor 31 will continue to rotate. The direction of the rotation is governed by the direction of the diodes relative to the leading face. Mechanical energy can be drawn from the axis. A pulsating direct current is produced in coils 28 as rotor 31 turns.

FIGS. 26 and 27 show the construction of a band coil. Band Coil 8 is formed by rolling an aluminum sheet 58 of increasing thickness equatorially over itself. The inside laminate of band coil 8 is then electrically connected by lead 59 to outside laminate to create a circuit.

I claim:

1. An apparatus for generating electrical currents comprising:

a first cylindrical magnetic dipole having a first end with a magnetic-north pole and an opposed second end with a magnetic-south pole, wherein the diameter of said first end is greater than the diameter of said second end, a second cylindrical magnetic dipole having a first end with a magnetic-north pole and an opposed second end with a magnetic-south pole, wherein the diameter of said first end is greater than the diameter of said second end, a non-magnetic cylindrical spacer connecting said second end of said first dipole to said second end of said second dipole along their respective axis, to form a piston having the diameter of its ends greater than the mid-portion thereof, a circular, conducting band coil that encircles said piston, said coil having an inner diameter greater than the diameter of said second ends of said first and second dipoles and said coil having an inner diameter less than the diameter of said first ends of said dipoles, and said coil having an outer diameter greater than the diameter of said first ends of said dipoles, a reciprocating means for moving said piston in a back and forth motion such that said piston travels back and forth relative to said coil, an electrical current created when said piston travels back and forth in relation to said coil, and an electrical energy output means attached to said coil.

2. An apparatus as described in claim 1, wherein a magnetic field is generated by said coil that aids the motion of the piston.

* * * * *